United States Patent
Singh

(10) Patent No.: US 12,309,886 B2
(45) Date of Patent: *May 20, 2025

(54) SMALL-CELL BASE STATION LOCATION REGISTRATION

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,081

(22) Filed: Sep. 26, 2023

(65) Prior Publication Data

US 2024/0022899 A1 Jan. 18, 2024

Related U.S. Application Data

(63) Continuation of application No. 17/102,800, filed on Nov. 24, 2020, now Pat. No. 11,800,349.

(51) Int. Cl.
*H04W 8/26* (2009.01)
*H04W 4/02* (2018.01)
(Continued)

(52) U.S. Cl.
CPC ............... *H04W 8/26* (2013.01); *H04W 4/02* (2013.01); *H04W 4/24* (2013.01); *H04W 72/541* (2023.01);
(Continued)

(58) Field of Classification Search
CPC .......... A61M 11/044; A61M 2205/123; A61M 2205/3306; A61B 5/024; A61B 5/14551; A61B 2560/0242; A61B 2560/0468; A61B 2562/0238; A61B 2562/168; B05B 5/001; G01N 33/004; G01N 33/0047; H04W 72/541; H04W 24/02

See application file for complete search history.

(56) References Cited

U.S. PATENT DOCUMENTS 10,819,707 B1 * 10/2020 Sokolov ............... H04L 63/0876
11,800,349 B2 * 10/2023 Singh ................ H04M 15/8033
(Continued)

OTHER PUBLICATIONS

Wireless Innovation Forum, CBRS Deployment Guidelines for Installers, Document WINNF-TR-5001, Version V1.0.0, Dec. 11, 2018, pp. 1-8.
(Continued)

*Primary Examiner* — Brandon J Miller
(74) *Attorney, Agent, or Firm* — Armis IP Law, LLC

(57) ABSTRACT

A system, method and apparatus for registering a wireless station such as a CBRS transmitter establishes registration parameters including location and channel information for avoiding interference from other wireless stations in close proximity. A network address of the wireless station is employed to identify location information in GPS coordinates by referencing a subscriber database with billing or service address information. Registration proceeds with the mapped GPS address and a frequency or channel subject to little or no interference with nearby wireless station by ensuring sufficient geographic and bandwidth separation.

23 Claims, 8 Drawing Sheets

(51) Int. Cl.
  *H04W 4/24* (2024.01)
  *H04W 72/541* (2023.01)
  *H04W 84/12* (2009.01)
  *H04W 88/08* (2009.01)
  *H04W 92/02* (2009.01)

(52) U.S. Cl.
  CPC ........... *H04W 84/12* (2013.01); *H04W 88/08* (2013.01); *H04W 92/02* (2013.01)

(56) References Cited

U.S. PATENT DOCUMENTS

| | | |
|---|---|---|
| 2009/0129263 A1 | 5/2009 | Osborn |
| 2015/0289300 A1* | 10/2015 | Zhang .................... H04W 8/18 370/328 |
| 2018/0027502 A1 | 1/2018 | Gacanin |
| 2018/0332583 A1 | 11/2018 | Shah et al. |
| 2019/0215698 A1 | 7/2019 | Balachandran et al. |
| 2020/0274628 A1* | 8/2020 | Towfiq .................... H04L 41/12 |
| 2021/0168618 A1* | 6/2021 | Yavuz .................... H04W 84/18 |

OTHER PUBLICATIONS

Wireless Innovation Forum, CBRS Deployment Guidelines for Installers, Document WINNF-TR-5001, Version V1.1.0, Aug. 5, 2020, pp. 1-15.

Wireless Innovation Forum, Signaling Protocols and Procedures for Citizens Broadband Radio Service (CBRS): Spectrum Access System (SAS)—Citizens Broadband Radio Service Device (CBSD) Interface Technical Specification, Document WINNF-TS-0016, Version V1.2.7, Mar. 21, 2022, pp. 1-60.

Wireless Innovation Forum, Signaling Protocols and Procedures for Citizens Broadband Radio Service (CBRS): Spectrum Access System (SAS)—SAS Interface Technical Specification, Document WINNF-TS-0016, Version 1.3.2, Mar. 11, 2020, pp. 1-44.

* cited by examiner

SMALL-CELL BASE STATION LOCATION REGISTRATION

This application is a continuation of earlier filed U.S. patent application Ser. No. 17/102,800 entitled "SMALL-CELL BASE STATION LOCATION REGISTRATION," filed on Nov. 24, 2020, the entire teachings of which are incorporated herein by this reference.

BACKGROUND

Citizens Broadband Radio Service (CBRS) refers to 150 MHz of spectrum in the 3550 MHz to 3700 MHz range (3.5 GHz to 3.7 GHz) that the United States Federal Communications Commission (FCC) has designated for sharing among three tiers of users: incumbent users, priority access license (PAL) users and general authorized access (GAA) users. CBRS transmitters invoke a central coordination service, called a Spectrum Access System (SAS), for assigning unique radio channels based on the exact location of the radio transmitters. CBRS radio waves are therefore free from interference that is common to unlicensed alternatives in the ISM and UNIT bands (WiFi bands).

SUMMARY

A system, method and apparatus for registering a wireless station such as a CBSD (Citizens Broadband radio Service Device) transmitter establishes registration parameters including location and channel information. CBSD transmitters in close proximity encounter interference if using the same or close frequencies. In one embodiment, a self-install of the wireless station identifies location information such as in GPS (Global Positioning System) coordinates by referencing a subscriber database with billing or service address information mapped to devices deployed at the subscriber's address. A postal street address where service is provided is translated or mapped to determine the GPS coordinates (location) where the wireless station is deployed. Registration proceeds with the mapped GPS address and a frequency or channel subject to little or no interference with nearby wireless station by ensuring sufficient geographic and bandwidth separation. In other words, registration and use of determined location of a respective wireless access point or wireless base station avoids assigning adjacent neighbors the same or similar channels on a frequency likely to cause interference.

Wireless services are a rapidly expanding technology. Increased user demand is driven by an ever increasing availability of mobile applications (apps) coupled with increases in bandwidth-hungry uses, particularly streaming of media content. Conventional Wi-Fi™ is approaching user satisfaction thresholds for bandwidth and range. Configurations herein are based, in part, on the observation that CB SD equipment such as implementing LTE (Long Term Evolution) wireless communication protocols offer bandwidth and range advantages over Wi-Fi™ deployments. Unfortunately, while outdoor CB SD equipment can identify their location via GPS, conventional indoor CBSD equipment suffer from the shortcoming that deployments cannot rely on visibility (line of sight) of GPS satellite signals for identifying their deployed location. This presents challenges for ensuring geographical separation between transmitters to avoid interference.

Frequency allocation in the form of channels subdivides available transmission bandwidth, and bandwidth separation is required to avoid interference between closely located CBSD equipment. In other words, closely located CB SD equipment should be transmitting on sufficiently different frequency ranges to avoid interference. Accordingly, configurations herein substantially overcome the shortcomings of CBRS channel allocation by identifying a location of deployed CB SD equipment for avoiding allocation of the same or close frequency to one or more other CBSD equipment operating nearby.

Configurations herein facilitate installation and registration of a wireless station such as CBSD equipment by retrieving a network address corresponding to the wireless station, typically a MAC address identifier or other suitable value, and communicating the retrieved network address over a network to a communication management resource. In response to communicating the detected network address, the wireless station (such as CBSD equipment) receives location information from the communication management resource. The location information indicates a location of the wireless station. The wireless station then uses the location information during registration with a respective allocation management resource (such as a spectrum access system). The allocation management resource strategically allocates one or more wireless channels to the wireless station and other nearby wireless stations, avoiding interference from other nearby wireless communication devices.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Wireless service providers continually seek to expand their infrastructure to accommodate increasing consumer demands for wireless bandwidth. CBSD devices provide advantages over conventional Wi-Fi™ wireless stations because they provide increased and more reliable bandwidth. Configurations below depict CBSD equipment registration including allocation of one or more CBRS channels to the CBSD equipment depending on the location of the CB SD equipment in a network.

Figure 1:
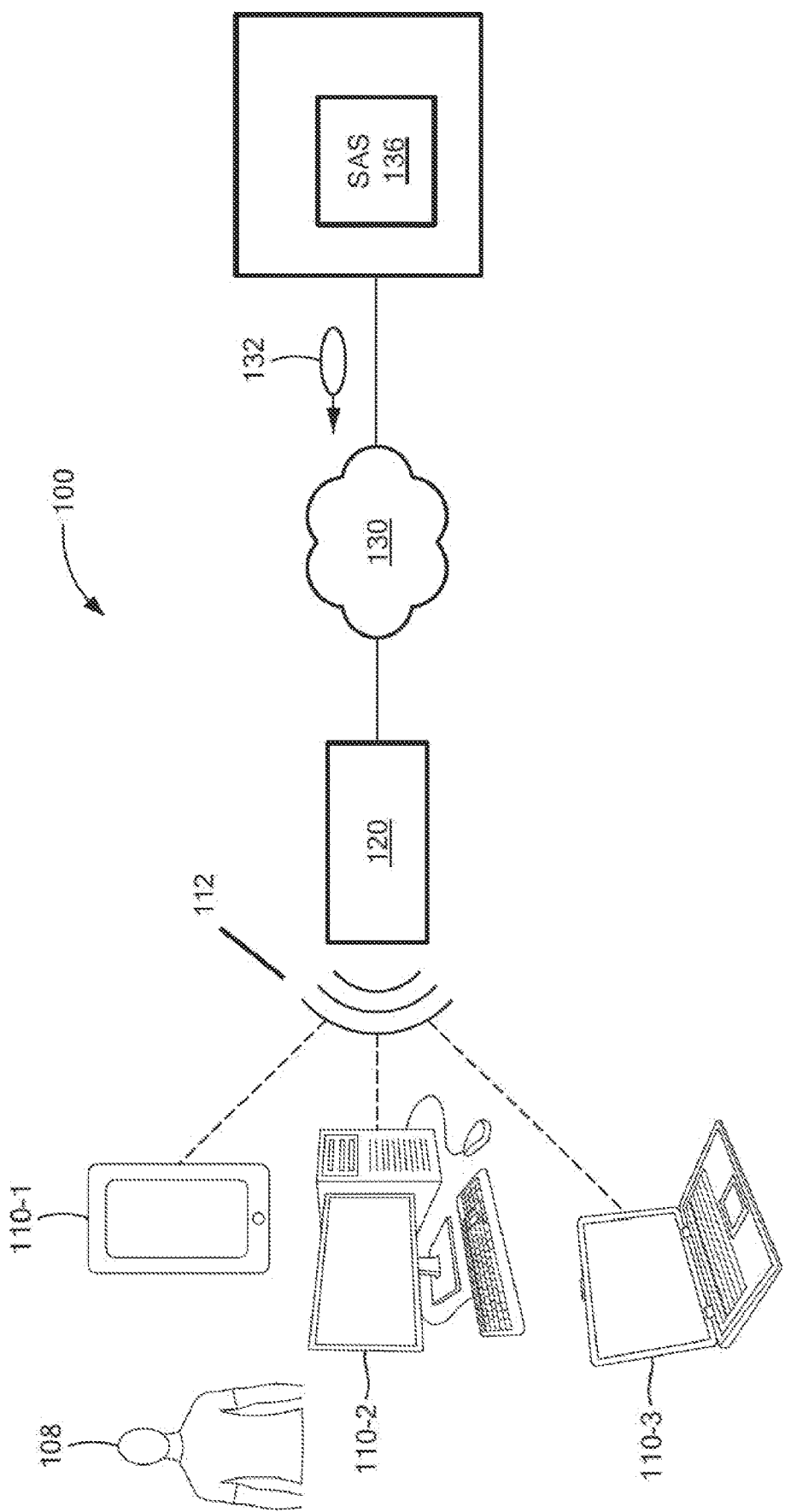
FIG. 1 is a context diagram showing a wireless service infrastructure suitable for use with configurations herein.

FIG. 1 is a context diagram showing a wireless service network infrastructure 100 suitable for use with configurations herein In the wireless services network infrastructure, 100, subscriber devices 110-1 . . . 110-3 (110 generally)

receive wireless services via wireless signals 112 from a wireless station 120 (such as CBSD equipment). The wireless station 120 provides services similar to a conventional Wi-Fi™ access point, but has certain advantages as discussed below. The subscriber devices 110 include a multitude of Internet conversant personal devices such as a smart phone 110-1, desktops 110-2, laptops and tablets 110-3, and other devices of various form factors are operable for receiving and rendering wireless services. Any suitable Internet conversant device may be employed with configurations herein.

Regardless of the physical device form, such subscriber devices 110 include wireless transmit and receive capabilities and interfaces for receiving content 132 from a wireless services provider. The wireless service provider providing wireless station 120 includes any available Internet based media/service source, typically a broadcast or streaming provider, often based on a subscription, or fee-for-services arrangement. The full range of available content and services is too numerous to outline, but includes any website or Internet source accessible via a browser or search engine for audio, visual, Internet commerce, publications, and computation resources. Streaming services for movies and television represent a large portion of wireless services available.

Wireless station 120 deployments, in particular, benefit from an allocation management resource 136 (such as a Spectrum Access System or SAS) that manages channel allocations between multiple wireless stations present in the network environment 100 and nearby wireless station 120.

CBSD equipment are categorized according to power limits as category A and B. While category B is reserved for high power, outdoor placement, the lower power category A transmitters are appropriate for indoor residential or office installation, under certain conditions. Category A CBSDs can be installed (self install) by a user, facilitating deployment by reducing costs. In one embodiment, to be user installed, the category A CBSD must meet the following characteristics:

Automatically determine its location (such as GPS information or other suitable information) and provide the location as part of the CB SD registration process.

Operate at or below predetermined power levels specified for a Category A device.

Maximum antenna height <6 meters above the average terrain.

Individual subscriber sites rarely have a need for 6 meter antenna, and power levels can be set by the wireless station itself. If follows that if a Category A CBSD is capable of automatically determining its location (GPS) within the required horizontal and vertical accuracies and provide the location information as part of the CB SD registration process to the SAS, it can be installed by the user. It would beneficial to provide a capability for Indoor Category A CBSDs to automatically identify their Geo Location Coordinates "Lat/Long/Height." However, GPS readings can be problematic to consistently obtain at indoor sites. Per current FCC (Federal Communications Commission), a category A CBSD is limited a maximum effective isotropic radiated power (EIRP) of 30 dBm/10 MHz, and a maximum Power Spectral Density (PSD) of 20 dBm/MHz. By contrast, end user devices are allowed only 23 dBm/10 of EIRP.

Figure 2A:
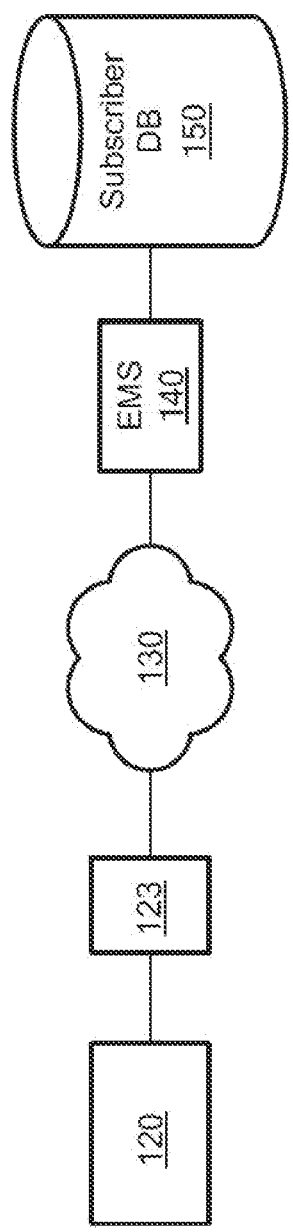
FIG. 2A is a block diagram of CBRS installation and registration in the infrastructure of FIG. 1.
Figure 2B:
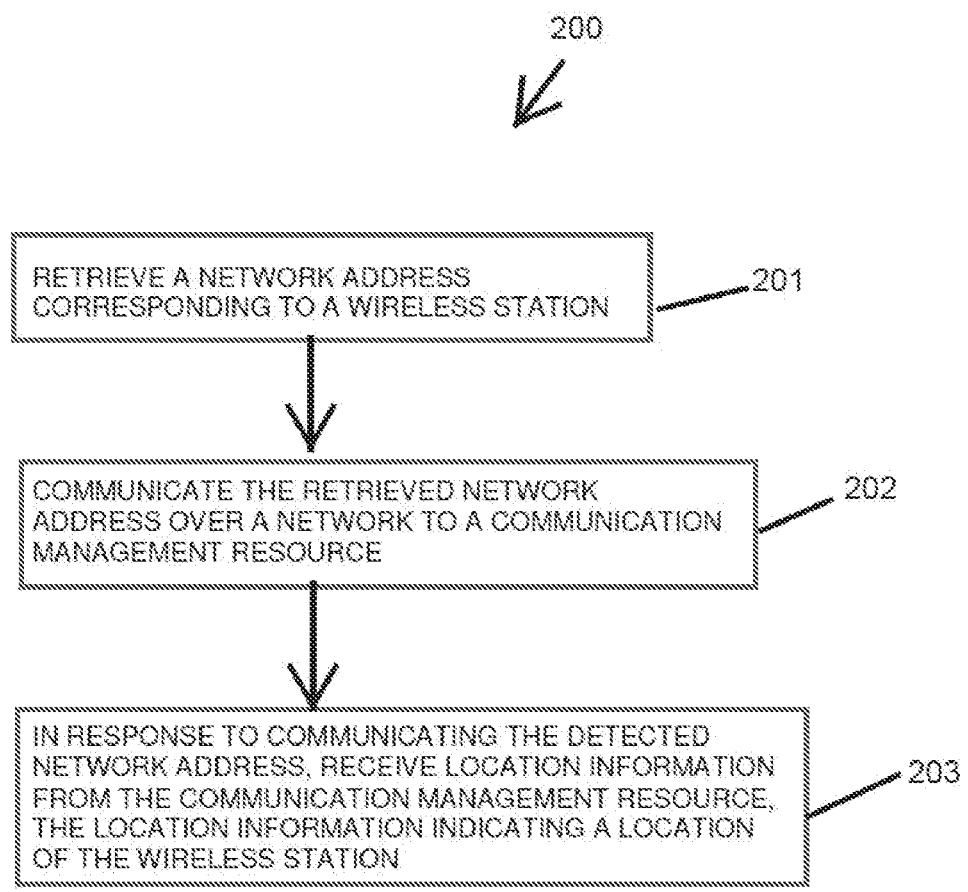
FIG. 2B is a flowchart of CBRS installation and registration in the infrastructure of FIG. 1.

FIG. 2A is a block diagram of CB SD equipment installation and registration in the infrastructure of FIG. 1, and FIG. 2B is a flowchart 200 of CBSD equipment installation and registration in the infrastructure of FIG. 1. Referring to FIGS. 2A and 2B, the wireless station 120 couples to (such as establishes connectivity with) an Element Management System (EMS) 140 (a.k.a., a communication management resource) through gateway hardware 123 (such as a cable Modem).

Accordingly, as shown in FIG. 2B, the wireless station 140 retrieves a network address of the gateway hardware 123 as depicted in operation 201. In particular configurations, the network address may be a MAC (Media Access Control) identifier or other unique value or designator.

In operation 202, the gateway hardware 123 communicates the retrieved network address of the gateway hardware 123 over a network 130 to a communication management resource 140. As shown, the communication management resource 140 has access to information about a subscriber installing the wireless station 120 such as the location of the subscriber domain 150 where the gateway hardware 123 resides, subscriber and configuration capabilities of the wireless station 120 served by the provider 134.

In response to communicating the detected network address of the gateway hardware 123 to the communication management resource 140, the communication management resource 140 identifies a location of the gateway hardware 123 and corresponding wireless station 120 being installed. The communication management resource 140 communicates the location information (such as where the gateway hardware 123 is located) to the wireless station 120.

Determination of the location of the gateway hardware 123 can include the communication management resource 140 performing a lookup in a subscriber database 150 to identify location information for computing GPS coordinates of the wireless station 120. As will be detailed further below, depending on the embodiment, the location information can be obtained from a billing address of the subscriber, or a shipping destination address of the wireless station, depending on the type of installation and corresponding registration procedure. The allocation management resource 136 (such as spectrum access system) is identifies and allocates non-interfering channels to CBRS transmitters based on available frequencies and proximity to other wireless communication devices. After successful registration of the wireless station 120 with the allocation management resource 136, via the allocation management resource assigns one or more non-interfering channels to the wireless station 120.

Figure 3:
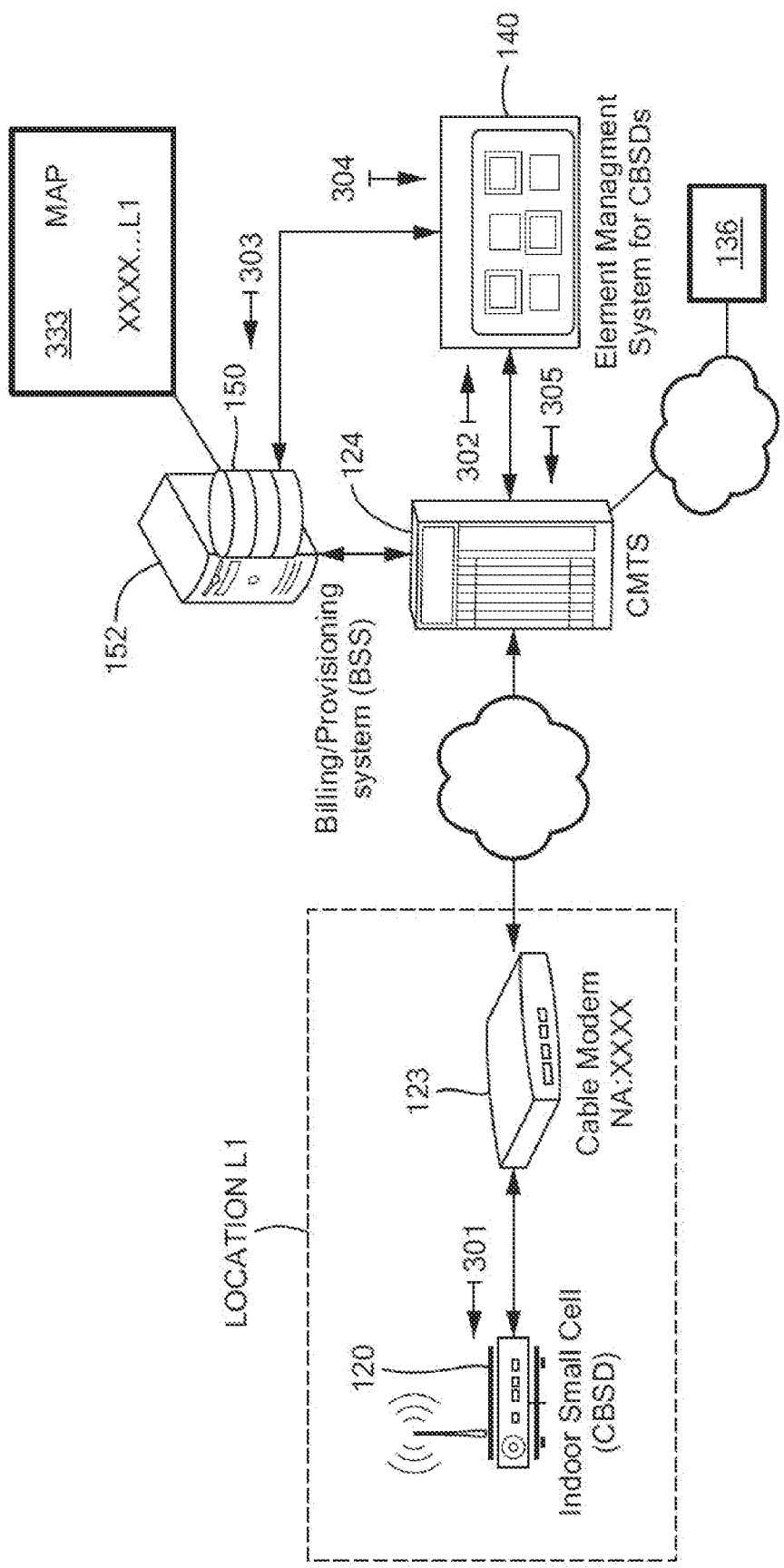
FIG. 3 is a diagram of CBRS deployment in conjunction with a cable modem according to FIG. 2.

FIG. 3 is a diagram of CBRS deployment in conjunction with gateway hardware 123 such as a cable modem according to FIG. 2. Depending on the type of installation, different approaches to obtaining the GPS location of the CBRS are invoked.

For example, in a first configuration, the network address of the gateway hardware 123 is received from the gateway hardware 123 such as a cable modem disposed between the wireless station 120 and the network 130, such that the network address used for location information is the address assigned to the gateway resource. In one embodiment, during power on of the wireless station 120, the wireless station 120 records the network address (such as the MAC address of a cable modem), via communications 301. In a typical installation, the network address is an address of the gateway hardware 123 (such as cable modem) deployed at the location of the wireless station 120. In other words, in one embodiment, the wireless station 120 is installed for use in a subscriber domain in which the gateway hardware 123 and subscriber 108 resides and is registered with a respective service provider.

In one embodiment, the gateway hardware 122 (such as a cable modem or other suitable device or hardware) is an integral part of the Internet connection that connects with a communication management resource 124 such as a Cable Modem Termination System (CMTS) associated with a respective service provider. In one embodiment, the wireless station 120 potentially replaces a WIFI router connected to the gateway hardware 123. Via communications 302, the wireless station 120 communicates the retrieved network address of gateway hardware 123 through the gateway hardware 123 and communication management resource 124 to the communication management resource 140.

In one embodiment, the communication management resource 140 is configured to invoke a subscriber account database 150 (such as billing/provisioning system) for mapping the network address of the gateway hardware 123 to a customer street address (or other suitable location information) where the gateway hardware 123 is deployed. The communication management resource 140 sends the network address (such as MAC address) of the gateway hardware 123 to a BSS (billing and provisioning system) 152 to find the customer address of the subscriber 108, as depicted in communication 303. Via map 333, the system 152 invokes the database 150 to map the network address XXXX of the gateway hardware 123 to the location L1.

In one embodiment, the billing and provisioning system 150/152 handles subscriber accounts, subscription packages and devices deployed at the subscriber's service address. For example, the billing and provisioning system 152 includes or has access to a subscriber account database 150. In one embodiment, the system 152 maps the network address of the gateway hardware 123 to the corresponding subscriber 108 installing the wireless station 120, which in turn maps to a billing address indicating the street address where the gateway hardware 123 is deployed. The billing and provisioning system 152 sends the location information (L1) of the gateway hardware 123 back to the communication management resource 140, as disclosed via communication 304.

Since the wireless station 120 is deployed at the same location as the gateway hardware 123, the communication management resource 140 computes, based on the customer street address, a global reference (location information) corresponding to the customer street address. In the example configuration, the global reference are GPS coordinates of the parcel (such as subscriber domain or home environment) denoted by the street address of the subscriber installing the wireless station 120.

The communication management resource 140 sends the location data (indicating a location of the gateway hardware 123) back to the wireless station 120 through communication management resource 124 and gateway hardware 123, as depicted via communications 305, which the wireless station 120 in turn uses to perform registration with the allocation management resource 136. As previously discussed, the allocation management resource 136 (FIG. 1) allocates one or more wireless channels (such as from a CBRS band or other suitable bandwidth) based on the computed global reference for providing wireless services via the allocated wireless channel at the location of the wireless station 120.

In one embodiment, the location information (in communications 305) received by the wireless station 120 is accurate to within about 50 meters, which is adequate for a typical parcel size in a residential area. A reliable GPS location application can generate the location with sufficient accuracy based on identification of the property parcel based on the street address as defined by the U.S. Postal Service or other suitable entity.

Figure 4:
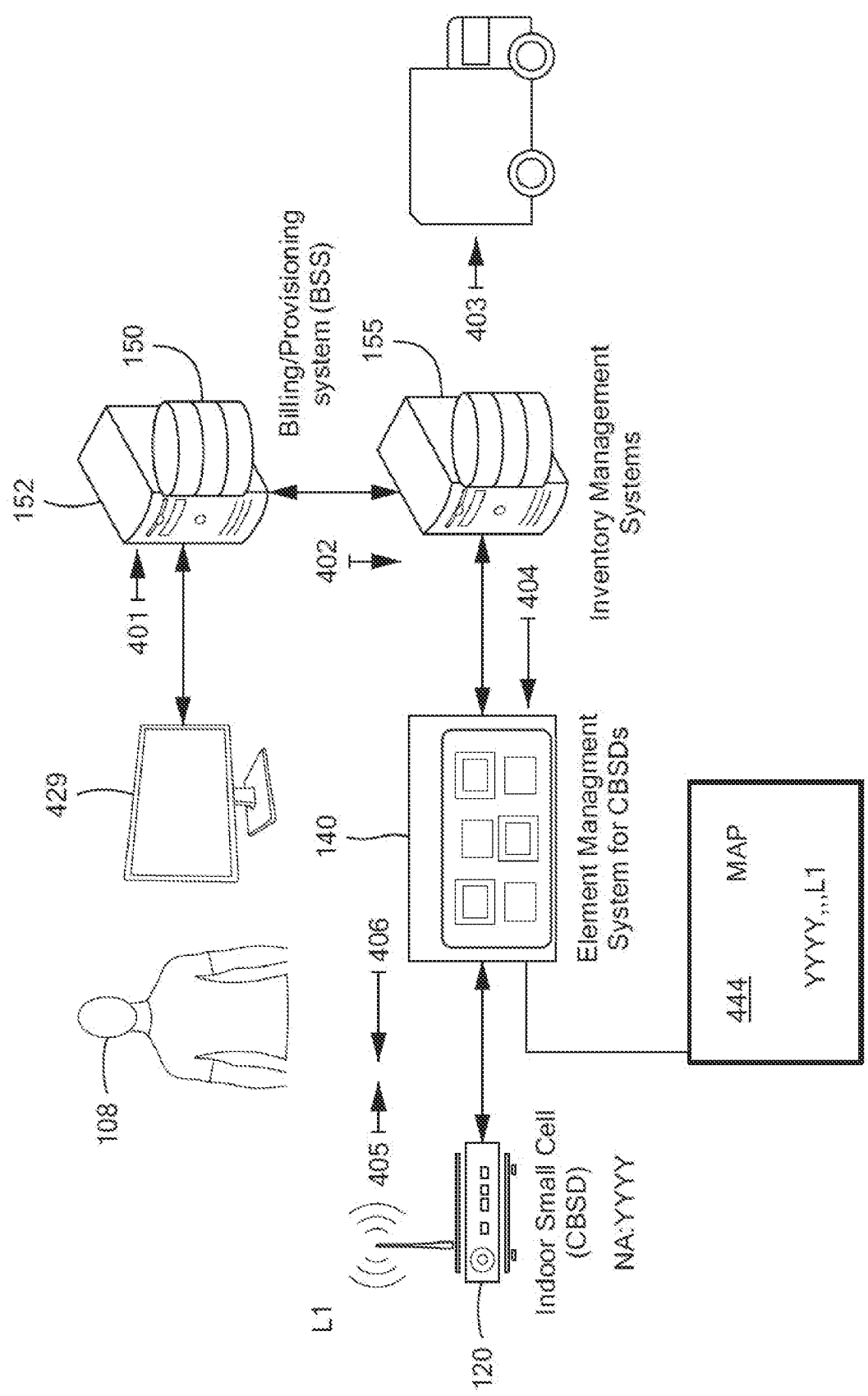
FIG. 4 is a diagram of CBRS deployment using a customer self-install according to FIG. 2.

FIG. 4 is a diagram of wireless station deployment using a customer self-install according to FIG. 2. In another scenario, a wireless station 120 is deployed for customer self-install from a shipping facility that stores the wireless station 120 until it is assigned for use by the subscriber 108. Referring to FIGS. 1, 2 and 4, a similar approach is employed using the destination shipping address of the wireless station 120 to program it with its location. At operation 401, an order for an indoor CBSD is received at system 150/152 from a customer 108 operating computer 429. The wireless station 120, like most network devices, is assigned a network address such as a MAC address for uniquely identifying its network hardware entity. In one embodiment, the MAC address defines the network address corresponding to the subscriber account (associated with subscriber 108) for which the wireless station 120 is being deployed.

At operation 402, the system 150/152 generates a respective order and assigns wireless station 120 to the subscriber. The system 150/152 generates an order is into the inventory management system 155, indicating assignment of the wireless station 120 to the subscriber 108.

The inventory management system 155 receives details of the order and, via operation 403, ships the wireless station 120 (such as assigned network address YYYY) via a carrier to the customer service address. The inventory management system 155 provides details (such as network address of wireless station 120, identity of wireless station, etc.) of the order to the communication management resource 140.

Additionally, or alternatively, the communication management resource 140 invokes the subscriber account database 150 and system 152 for identifying the location (such as customer street address) corresponding to the subscriber account.

In one embodiment, the inventory management system 155 updates the communication management resource 140 with the location information for the wireless station 120 (such as CBSD) along with MAC address (YYYY) and serial No. of the wireless station 120 identifying the shipped CBSD and destination address (such as location of the subscriber 108), as disclosed at operation 404.

The subscriber 108 receives and installs the wireless station 120 in a respective subscriber domain where the subscriber resides. Upon powering the wireless station 120, the wireless station 120 communicates with the communication management resource 140 over a respective network to retrieve configuration data associated with location information where the subscriber resides. Thus, upon delivery and power on, the wireless station 120 contacts the communication management resource 140 to obtain configuration information including its location via operation 405.

In response to the inquiry, the communication management resource 140 sends the wireless station 120 the computed GPS coordinates (i.e., location information) via communications 406. This provides the wireless station 120 the needed location information for invoking the allocation management resource 136, which allocates one or more wireless channels for use by the wireless station based on the location information (a.k.a., computed global reference).

After registering with the allocation management resource 136, and being allocated one or more wireless channels, wireless station 120 is now operational for providing wireless services via the allocated one or more wireless channels at the current installation location of the wireless station 120.

Figure 5A:
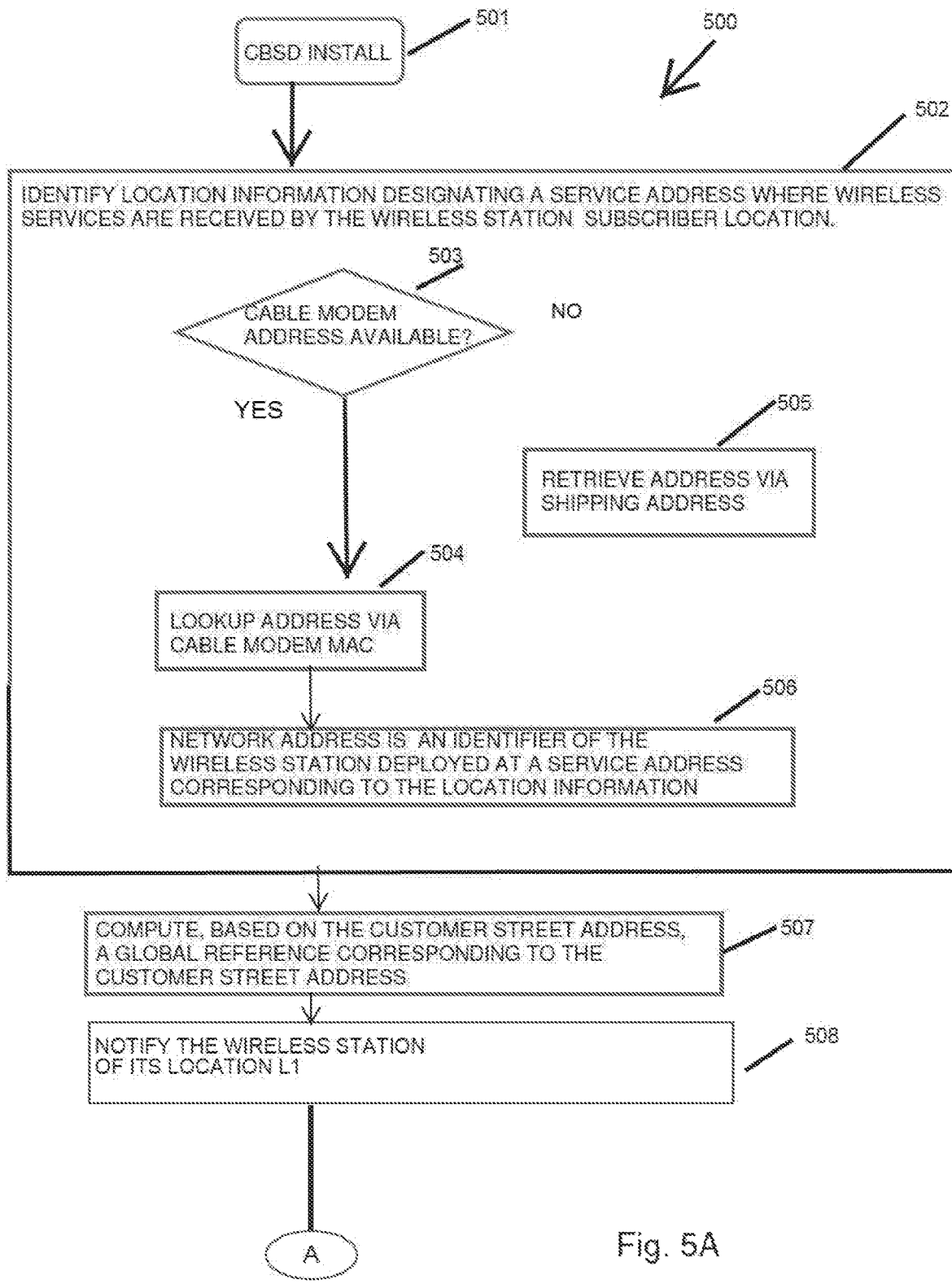
FIGS. 5A-5B are a flowchart of CBRS registration logic of FIGS. 2A-3.
Figure 5B:
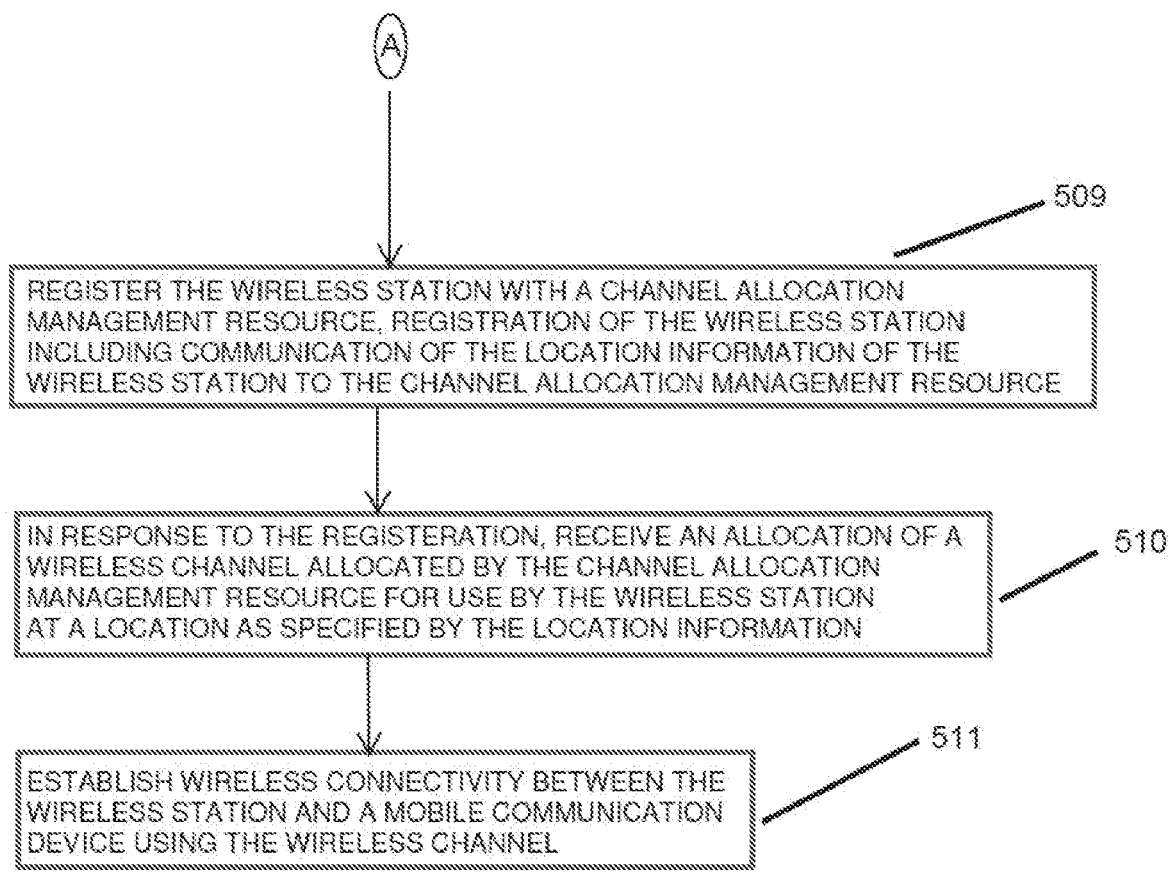

FIG. 5 is a flowchart 500 of wireless station registration logic of FIGS. 2A-3. Referring to FIGS. 1-5B, commencing at operation 501 for a wireless station 120 install for CBSD equipment, the communication management resource 140 (such as an element management system) identifies location information designating a service address where the wireless station 120 resides, as depicted at operation 502.

A check is performed, at operation 503, to determine if the network address (such as MAC address) of a co-located cable modem (gateway hardware 123) is available, as discussed in FIG. 3 above. If so, then at operation 504 the location information for the subscriber address is retrieved based on a lookup from the cable modem MAC address. Otherwise, in the case of a newly shipped install as discussed in FIG. 4 above, the subscriber address is determined from the shipping address used as the destination for the order (for example mapping a network address assigned to the wireless station 120 as indicated by a message from the wireless station 120 to a location where the wireless station 120 was shipped), as depicted at operation 505. In either case the network address is an identifier of or associated with the wireless station 120 deployed at a service address corresponding to the location information, as shown at operation 506. In other words, the network address of the gateway hardware 123 is used to determine the location of the installed wireless station 120 or the network address of the wireless station 120 itself is used to determine a location of the installed wireless station 120.

The communication management resource 140 computes, based on the customer street address, a global reference corresponding to the customer street address, typically in GPS coordinates, as depicted at operation 507.

In operation 508, the communication management resource 140 notifies the wireless station 120 of its location L1. Thus, the wireless station 120 receives the location information (such as GPS coordinates) along with other configuration information from the communication management resource 140 to operate the wireless station 120 for registration with the allocation management resource 136.

As previously discussed, the allocation of one or more wireless channels is performed such that other closely located CBSDs are not on the same or nearby frequencies that could interfere, for example avoiding placing two adjoining households on channels defined by adjacent frequencies.

As further shown, in operation 509, the allocation management resource 136 performs registration of the wireless station 120 responsive to the communication of the location information of the wireless station 120 to the channel allocation management resource 136.

In response to registration, in operation 510, the wireless station 120 receives notification of the one or more wireless channels allocated by the channel allocation management resource 136 for use by the wireless station 120 at a location L1 as specified by the location information.

The wireless station 120 is now operational for establishing wireless connectivity between the wireless station 120 and a mobile communication device (such as personal devices 110-1, 110-2, 110-3, etc.) using the allocated wireless channel, as depicted at operation 511.

Figure 6:
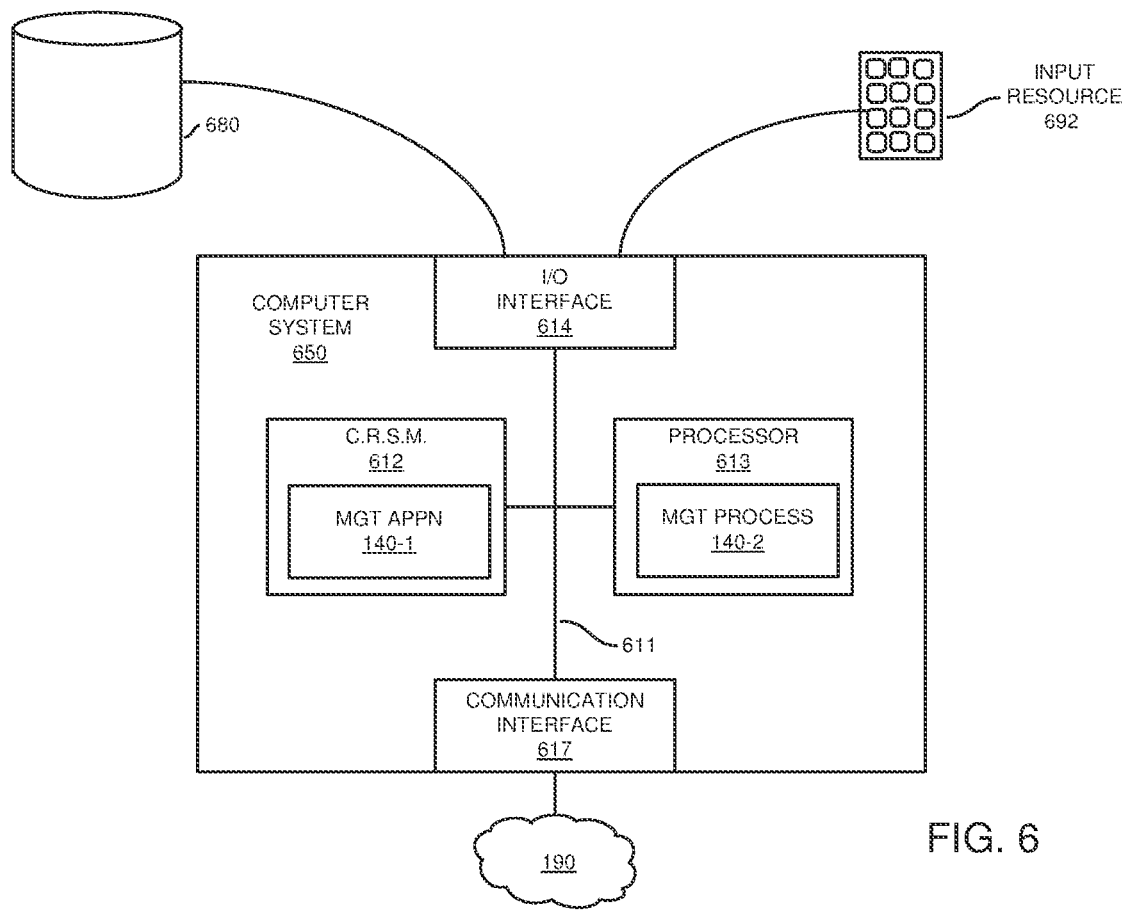
FIG. 6 is an example diagram illustrating example computer architecture operable to execute one or more operations according to embodiments herein.

FIG. 6 is an example block diagram of a computer system for implementing any of the operations as previously discussed according to embodiments herein. Any of the resources as discussed herein (such as wireless station 120, gateway hardware 122, communication management resource 140, management system and corresponding components, resources, etc.) can be configured to include computer processor hardware, analog/digital circuitry, and/or corresponding executable instructions to carry out the different operations as discussed herein.

As shown, computer system 650 of the present example includes an interconnect 611 that couples computer readable storage media (C.R.S.M) 612 such as a non-transitory type of media (i.e., any type of hardware storage medium) in which digital information can be stored and retrieved, a processor 613, I/O interface 614, and a communications interface 617.

I/O interface(s) 614 supports connectivity to repository 680 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with management application 140-1 (e.g., including instructions) to carry out any of the operations as discussed herein.

During operation of one embodiment, processor 513 accesses computer readable storage media 612 via the use of interconnect 611 in order to launch, run, execute, interpret or otherwise perform the instructions in management application 640-1 stored on computer readable storage medium 612. Execution of the management application 640-1 produces management process 640-2 to carry out any of the operations and/or processes as discussed herein.

Those skilled in the art will understand that the computer system 650 can include other processes and/or software and hardware components, such as an operating system that controls allocation and use of hardware resources to management application 640-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 650 may reside at any location or can be included in any suitable resource in any network environment to implement functionality as discussed herein.

Those skilled in the art should readily appreciate that electronic logic and instructions as disclosed herein are open to implementation in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method comprising: retrieving a network address for a wireless station; communicating the retrieved network address over a network to a communication management resource; associating, by the communication management resource, the network address with a subscriber account for which the wireless station will be deployed; invoking a subscriber account database based on the subscriber account for identifying a customer location corresponding to the subscriber account; computing, based on the customer location, a global reference corresponding to a customer street address; and providing wireless services at the customer location of the wireless station based on the customer street address.

2. The method as in claim 1, wherein the network address is assigned to the wireless station.

3. The method as in claim 1, wherein retrieving the network address includes:
receiving the network address from a gateway resource disposed between the wireless station and the network, the network address assigned to the gateway resource.

4. The method as in claim 1 further comprising:
registering the wireless station with a channel allocation management resource, registration of the wireless station including communication of location information indicative of a location of the wireless station to the channel allocation management resource.

5. The method as in claim 4 further comprising:
in response to the registering, receiving allocation of a wireless channel allocated by a channel allocation management resource for use by the wireless station at a location as specified by the location information; and
establishing wireless connectivity between the wireless station and a mobile communication device using the wireless channel.

6. The method of claim 5 further comprising:
allocating the wireless channel based on a likelihood of causing interference with channels allocated to other wireless stations.

7. The method of claim 4 wherein registering further comprises:
identifying other wireless stations deployed in locations likely to cause interference with the wireless station; and
computing a wireless channel for allocation based on a likelihood of causing interference with other wireless channels allocated to the other wireless stations.

8. The method of claim 1 wherein the customer location designates a service address where wireless services are received by the wireless station.

9. The method of claim 1 wherein the network address is an identifier of the wireless station deployed at a service address corresponding to the customer location.

10. A method comprising:
retrieving a network address of a cable modem deployed at a location of a wireless station for deployment;
communicating the retrieved network address over a network to a communication management resource for identifying a subscriber account;
invoking a subscriber account database for mapping the network address to a customer location where the cable modem is installed based on the subscriber account;
the method further comprising:
computing, based on the customer location, a global reference corresponding to the customer location; and
providing wireless services at the location of the wireless station based on the global reference.

11. A wireless communication management device, comprising:
a network interface configured to receive a network address for a wireless station deployed for a subscriber;
a database interface to a communication management resource, the interface configured to communicate the received network address,
the communication management resource configured to:
associate the network address with a subscriber account for which the wireless station will be deployed;
invoke a subscriber account database for identifying a customer street address corresponding to the subscriber account; and
compute, based on the customer street address, a global reference corresponding to the customer street address;
an interface to a channel allocation management resource, the channel allocation management resource configured to register the wireless station in response to a registration request including a location of the wireless station based on the global reference;
as a result of the registration, the wireless station provides wireless services at the location of the wireless station.

12. The method as in claim 11, wherein the network address is assigned to a wireless station configured for providing wireless services to subscribers.

13. The method as in claim 11, wherein the wireless station is configured to retrieve the network address from a gateway resource disposed between the wireless station and the network, the network address assigned to the gateway resource.

14. The method as in 11 wherein the wireless station is further configured to:
in response to the registration, receive an allocation of a wireless channel allocated by the channel allocation management resource for use by the wireless station at a location as specified by the location information; and
establish wireless connectivity between the wireless station and a mobile communication device using the wireless channel.

15. The method as in claim 14 wherein the channel allocation management resource is configured to allocate the wireless channel based on other wireless channels already allocated to other wireless stations proximate to the wireless station.

16. The method of claim 14 wherein the channel allocation management resource allocates the wireless channel based on a likelihood of causing interference with channels allocated to other wireless stations.

17. The method of claim 11 wherein:
the network address is an address of a cable modem deployed at the location of the wireless station;
the network address is transmitted via a wired network to the channel allocation management resource; and the channel allocation management resource is configured to invoke a subscriber account database for mapping the network address to a customer street address where the cable modem is deployed;

the communication management resource further configured to compute, based on the customer street address, a global reference corresponding to the customer street address;

the channel allocation management resource configured to allocate a wireless channel based on the computed global reference; and the wireless station configured to provide wireless services via the allocated wireless channel at the location of the wireless station.

18. The method of claim 11 wherein the channel allocation management resource is further configured to:

identify other wireless stations deployed in locations likely to cause interference with the wireless station; and compute a wireless channel for allocation based on a likelihood of causing interference with other wireless channels allocated to the other wireless stations, identifying a deployment address.

19. The method of claim 11 wherein the channel allocation management resource is further configured to:

compute, based on the location of the wireless station, interference from other allocated wireless channels based on allocation of a first wireless channel to the wireless station;

compute, based on the location of the wireless station, interference from other allocated wireless channels based on allocation of a second wireless channel to the wireless station; and select, based on a lower computed interference, one of the first wireless channel and the second wireless channel for allocation to the wireless station.

20. The method of claim 14 wherein the location information designates a service address where wireless services are received by the wireless station.

21. The method of claim 14 wherein the network address is an identifier of the wireless station deployed at a service address corresponding to the location information.

22. The method of claim 21 wherein the network address is a MAC (Media Access Control) address, the service address is a property parcel address and the global reference is a GPS (Global Positioning System) designation.

23. A computer program embodying program code on a non-transitory medium having instructions stored thereon, the instructions, when carried out by computer processor hardware, cause the program code to: retrieve a network address for a wireless station deployed for a subscriber; communicate the retrieved network address over a network to a communication management resource; and associate, by the communication management resource, the network address with a subscriber account for which the wireless station will be deployed; invoke a subscriber account database based on the subscriber account for identifying a customer location corresponding to the subscriber account; compute, based on the customer location, a global reference corresponding to a customer street address; and provide wireless services at the customer location where wireless station is deployed based on the customer street address.

* * * * *